US008745022B2

(12) United States Patent
Pfeifle

(10) Patent No.: US 8,745,022 B2
(45) Date of Patent: Jun. 3, 2014

(54) FULL TEXT SEARCH BASED ON INTERWOVEN STRING TOKENS

(75) Inventor: Martin Pfeifle, Seewald (DE)

(73) Assignee: Navteq B.V., Veldhoven (NL)

( * ) Notice: Subject to any disclaimer, the term of this patent is extended or adjusted under 35 U.S.C. 154(b) by 0 days.

(21) Appl. No.: 13/301,994

(22) Filed: Nov. 22, 2011

(65) Prior Publication Data
US 2013/0132411 A1 May 23, 2013

(51) Int. Cl.
*G06F 17/30* (2006.01)

(52) U.S. Cl.
USPC .......... 707/706; 707/711; 707/724; 707/736; 707/771

(58) Field of Classification Search
USPC .......................... 707/706, 711, 724, 741–742
See application file for complete search history.

(56) References Cited

U.S. PATENT DOCUMENTS

| | | | |
|---|---|---|---|
| 5,710,915 A | | 1/1998 | McElhiney |
| 5,852,821 A * | | 12/1998 | Chen et al. ............................ 1/1 |
| 6,778,981 B2 | | 8/2004 | Lee et al. |
| 6,868,410 B2 | | 3/2005 | Fortin et al. |
| 7,231,388 B2 * | | 6/2007 | Matsubayashi et al. ...... 707/688 |
| 7,305,382 B2 * | | 12/2007 | Kobayashi .................... 707/709 |
| 7,426,507 B1 * | | 9/2008 | Patterson ............................... 1/1 |
| 7,707,139 B2 * | | 4/2010 | Okamoto et al. ............. 707/758 |
| 8,046,347 B2 * | | 10/2011 | Joshi ............................. 707/706 |
| 8,150,823 B2 * | | 4/2012 | Hamano et al. ............... 707/705 |
| 8,214,387 B2 * | | 7/2012 | King et al. .................... 707/770 |
| 8,407,216 B2 * | | 3/2013 | Walker et al. ................. 707/731 |
| 8,489,624 B2 * | | 7/2013 | King et al. .................... 707/758 |
| 8,554,786 B2 * | | 10/2013 | Yano et al. .................... 707/770 |

| | | | |
|---|---|---|---|
| 2002/0188581 A1 | 12/2002 | Fortin et al. | |
| 2003/0097356 A1 | 5/2003 | Lee et al. | |
| 2004/0215641 A1 | 10/2004 | Kothuri et al. | |
| 2005/0187916 A1* | 8/2005 | Levin et al. ........................ 707/3 |
| 2007/0106500 A1* | 5/2007 | Loofbourrow et al. ......... 704/10 |
| 2008/0016066 A1 | 1/2008 | Kuznetsov et al. | |
| 2008/0040384 A1 | 2/2008 | Kuznetsov | |
| 2008/0059462 A1 | 3/2008 | Millett et al. | |

(Continued)

FOREIGN PATENT DOCUMENTS

| | | |
|---|---|---|
| EP | 2306333 | 4/2011 |
| WO | WO2008005809 | 1/2008 |

OTHER PUBLICATIONS

Hearst et al., Tilebars: Visualization of Term Distribution Information in Full Text Information Access, May 7-11, 1995, pp. 59-66, Human Factors in Computing Systems, '95 Conference Proceedings, Denver, CO.

(Continued)

*Primary Examiner* — Hanh Thai
(74) *Attorney, Agent, or Firm* — Lempia Summerfield Katz LLC

(57) ABSTRACT

A method and system for full text search (FTS) using a navigation system is disclosed. The FTS system generates interwoven data tokens for documents that are stored in a database. An interwoven data token is combination of two or more data tokens and is formed by interweaving characters of one data token with characters of another data token. The FTS system may generate and store interwoven data tokens in a full text search index for each document stored in a database. The FTS system may receive two or more search terms inputted by a user and generate one or more interwoven data tokens based on the inputted search terms. The FTS system may then use the generated interwoven data token to query the full text search index.

19 Claims, 9 Drawing Sheets

(56) References Cited

U.S. PATENT DOCUMENTS

| | | | |
|---|---|---|---|
| 2010/0010977 A1* | 1/2010 | Choi et al. | 707/4 |
| 2010/0049765 A1 | 2/2010 | Asher et al. | |
| 2010/0077001 A1* | 3/2010 | Vogel et al. | 707/777 |
| 2010/0169361 A1* | 7/2010 | Chen et al. | 707/769 |
| 2010/0205175 A1* | 8/2010 | Dole | 707/729 |
| 2010/0217753 A1* | 8/2010 | Shlomot et al. | 707/693 |
| 2010/0306227 A1* | 12/2010 | Fleming et al. | 707/763 |
| 2010/0325011 A1 | 12/2010 | Foster et al. | |
| 2011/0004599 A1 | 1/2011 | Deninger et al. | |
| 2011/0044599 A1 | 2/2011 | Kowalczyk et al. | |
| 2011/0113064 A1* | 5/2011 | Govindachetty et al. | 707/771 |
| 2011/0196602 A1 | 8/2011 | Pfeifle et al. | |
| 2012/0158696 A1* | 6/2012 | Arasu et al. | 707/715 |
| 2013/0159320 A1 | 6/2013 | Gao et al. | |

OTHER PUBLICATIONS

International Search Report and Written Opinion for PCT/EP2013/056454, mailed May 7, 2013.

Shi Lei et al., Building a Protein Name Dictionary from Full Text: A Machine Learning Term Extraction Approach, Apr. 7, 2005, vol. 6, No. 1, BMC Bioinformatics, Biomed Central, London, GB.

Anonymous, Z-Order Curve, Apr. 1, 2011, http://en.wikipedia.ord/wiki/Z-order_curve.

International Search Report and Written Opinion for related PCT Application No. PCT/EP2012/072544, Mailed Apr. 10, 2013.

Oosterom et al., Spatial Location Code, Aug. 12, 1996, www.gdmc.nl/oosterom/slc.pdf.

International Search Report and Written Opinion for related applcation PCT/EP2012/072545, mailed Mar. 13, 2013.

* cited by examiner 45
72297
CLAUDIO
PIZZERIA
SCHWABSTRASSE
SEEWALD

FIG. 8A (45 & 72297) (45 & CLAUDIO) (45 & PIZZERIA) (45 & SCHWABSTRASSE) (45 & SEEWALD)
(72297 & CLAUDIO) (72297 & PIZZERIA) (72297 & SCHWABSTRASSE) (72297 & SEEWALD)
(CLAUDIO & PIZZERIA) (CLAUDIO & SCHWABSTRASSE) (CLAUDIO & SEEWALD)
(PIZZERIA & SCHWABSTRASSE) (PIZZERIA & SEEWALD)
(SCHWABSTRASSE & SEEWALD)

FIG. 8B (45 & 72297) (45 & CLAUDIO) (45 & PIZZERIA) (45 & SCHWABSTRASSE) (45 & SEEWALD)
4752            4C5L           4P5I            4S5C                    4S5E (72297 & CLAUDIO) (72297 & PIZZERIA) (72297 & SCHWABSTRASSE) (72297 & SEEWALD)
7C2L2A9U7D        7P2I2Z9Z7E          7S2C2H9W7A              7S2E2E9W7A (CLAUDIO & PIZZERIA) (CLAUDIO & SCHWABSTRASSE) (CLAUDIO & SEEWALD)
CPLIAZUZDEIROI        CSLCAHUWDAIBOS             CSLEAEUWDAILOD (PIZZERIA & SCHWABSTRASSE) (PIZZERIA & SEEWALD)
PSICZHZWEARBISAT           PSIEZEZWEARLIDA (SCHWABSTRASSE & SEEWALD)
SSCEHEWWAABLSDT

FIG. 8C

FULL TEXT SEARCH BASED ON INTERWOVEN STRING TOKENS

REFERENCE TO RELATED APPLICATIONS

The present patent application is related to the copending patent applications filed on the same date, Ser. No. 13/301,998, entitled "LOCATION BASED FULL TEXT SEARCH,"; and Ser. No. 13/302,000, entitled "FULL TEXT SEARCH USING R-TREES."

FIELD

The present invention relates generally to full text search, and more particularly, relates to using interwoven data tokens in a full text search system.

BACKGROUND

Full text search (FTS) systems search for relevant documents based on key words entered by a system user. The user enters a set of terms, referred to as tokens, and the FTS system retrieves documents that contain all of the terms in the set. In order to support efficient queries, the FTS system typically uses inverted indexes. For example, Lucene (described at http://lucene.apache.org/) and SQLite's FTS module (described at http://www.sqlite.org/cvstrac/wiki?p=FtsUsage) are both FTS systems that use inverted indexes.

An inverted index assigns a set of document identifiers to each token. The document identifiers are associated with documents that include the token at least once. Upon receiving a search request, the FTS system selects the set of document identifiers for each token in the request and then compares the document sets to each other. If a document identifier is contained in all document sets, the FTS system provides the document identifier in a result set of all identifiers contained in all document sets. From a logical point of view, the inverted index can be regarded as a relation InvertedIndex(Token, DocID) with a combined index on Token and DocID. The inverted index allows the FTS system to efficiently execute queries such as Query 1:

SELECT DocID FROM InvertedIndex WHERE Token='Neuschwanstein' If only a small number of documents belong to the result set, the FTS system's performance is generally good. If a user searches for documents that contain two terms 'Bavaria' and 'Neuschwanstein,' the FTS system executes a query such as Query 2:

```
SELECT DocID FROM InvertedIndex WHERE Token='Bavaria'
INTERSECT
SELECT DocID FROM InvertedIndex WHERE Token='Neuschwanstein'
```

Assume a database has one million documents containing the term 'Bavaria' and ten documents containing the term 'Neuschwanstein.' Although the size of the result set for Query 2 is equal to the size of the result set for Query 1, Query 2 takes much longer as the FTS system has to iterate over one million document identifiers belonging to the term 'Bavaria.'

While the inverted index works well in some applications, there is still room for improvement. For example, when the choice of search terms is limited, other full text search system designs may provide faster query response times.

SUMMARY

A method and system for performing a full text search that increases full text search query speed is described. The described method and system can be applied in conjunction with any standard full text search system and can be applied in combination with other index structures.

According to one example, an FTS system generates interwoven data tokens for documents that are stored in a database. An interwoven data token is a combination of two or more data tokens and is formed by interweaving characters of one data token with characters of another data token. The FTS system may generate and store interwoven data tokens in a full text search index for each document stored in a database. Generally, interwoven data tokens are more selective than individual data tokens. Therefore, executing a search using an interwoven data token may be faster and more efficient than executing a search using the underlying data tokens.

According to another example, an FTS system may receive two or more search terms inputted by a user and generate one or more interwoven data tokens based on the inputted search terms. The FTS system may then use the generated interwoven data token to query the full text search index.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein:

FIG. 8A depicts lexicographically-ordered data tokens that are associated with a point of interest, according to an example;

FIG. 8B depicts a set of token pairs based on the data tokens depicted in FIG. 8A, according to an example;

FIG. 8C depicts interwoven data tokens based on the token pairs depicted in FIG. 8B, according to an example;

DETAILED DESCRIPTION

The method and system for performing full text search as described herein may be performed on any computing platform, such as a navigation system, a server, a personal computer, a mobile telephone, and so on. A navigation system example is provided for purposes of explaining the details of the full text search system. However, it is understood that this is a non-limiting example.

I. Navigation System

Figure 1:
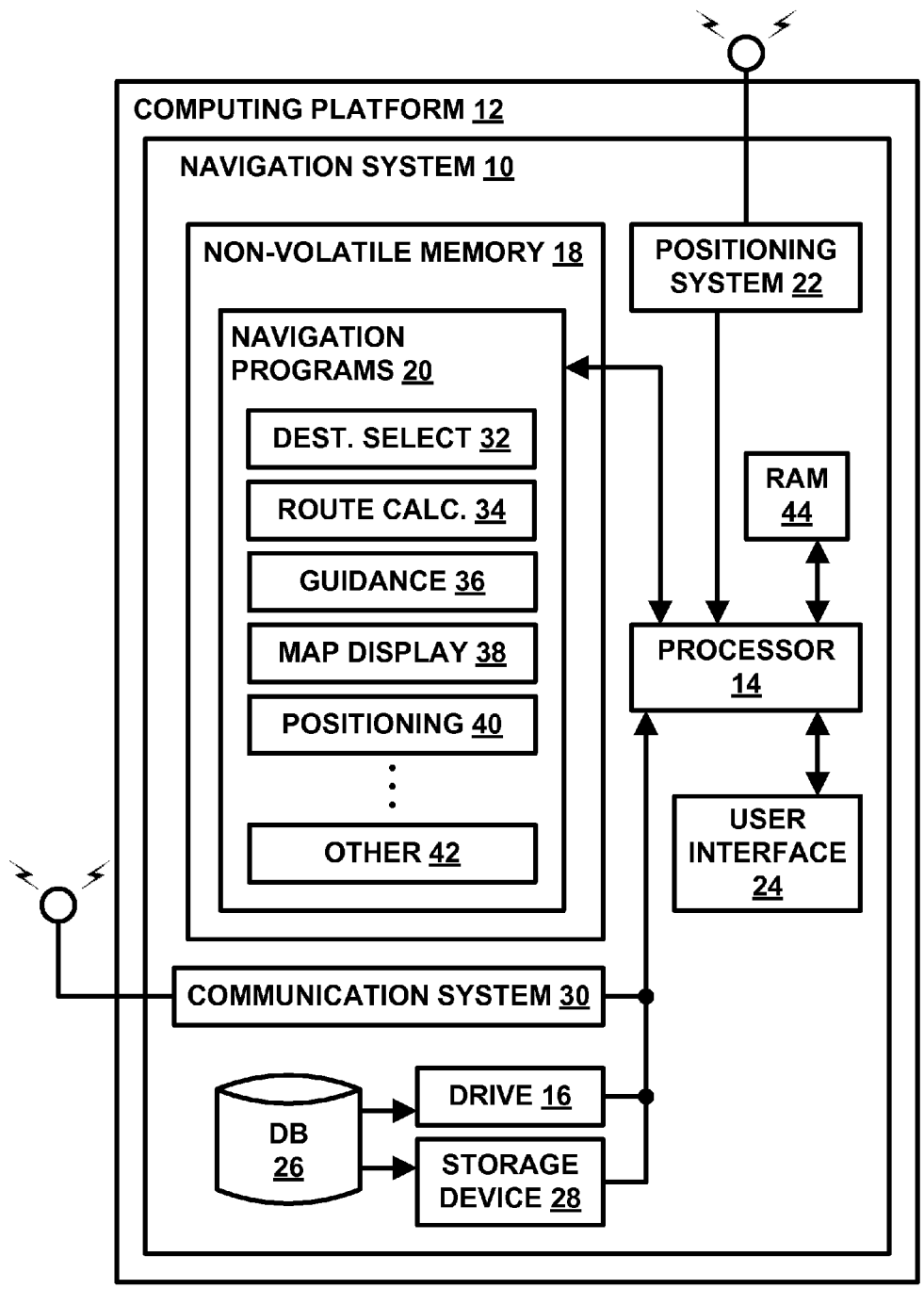
FIG. 1 is a block diagram depicting a navigation system, according to an example.

FIG. 1 is a block diagram of a navigation system 10 associated with a computing platform 12. The computing platform 12 may be associated with a vehicle. Additionally, the computing platform 12 may be a personal digital assistant (PDA), mobile telephone, personal computer, or any other computer. The navigation system 10 is a combination of hardware and software components. In one embodiment, the navigation system 10 includes a processor 14, a drive 16 connected to the processor 14, and a non-volatile memory storage device 18 for storing navigation application software programs 20 and possibly other information.

The navigation system 10 also includes a positioning system 22. The positioning system 22 may utilize GPS-type technology, a dead reckoning-type system, or combinations of these or other systems, all of which are known in the art. The positioning system 22 may include suitable sensing devices that measure the traveling distance speed, direction, orientation, and so on. The positioning system 22 may also include a GPS system. The positioning system 22 outputs a signal to the processor 14. The navigation application software programs 20 that run on the processor 14 use the signal from the positioning system 22 to determine the location, direction, orientation, etc., of the computing platform 12.

The navigation system 10 also includes a user interface 24 that allows the end user to input information into the navigation system 10 and obtain information from the navigation system 10. The input information may include a request for navigation features and functions of the navigation system 10. To provide navigation features and functions, the navigation system 10 uses a geographic database 26.

In one embodiment, the geographic database 26 is stored on a storage medium, such as a CD-ROM or DVD, that is installed in the drive 16 so that the geographic database 26 can be read and used by the navigation system 10. In one embodiment, the navigation system 10 also includes a storage device 28, such as a hard disk or memory card, on which all or a portion of the geographic database 26 is stored. In one embodiment, the geographic database 26 may be a geographic database published by NAVTEQ North America, LLC of Chicago, Ill. The geographic database 26 does not have to be physically provided at the location of the navigation system 10. In alternative embodiments, some or the entire geographic database 26 may be located remotely from the rest of the navigation system 10 and portions of the geographic data provided via a communications system 30, as needed.

In one exemplary type of system, the navigation application software programs 20 load from the non-volatile memory storage device 18 into a random access memory (RAM) 44 associated with the processor 14. The processor 14 also receives input from the user interface 24. The navigation system 10 uses the geographic database 26 stored on the storage medium and/or storage device 28, possibly in conjunction with the outputs from the positioning system 22 and the communications system 30, to provide various navigation features and functions. The navigation application software programs 20 may include separate applications (or subprograms) that provide the various navigation-related features and functions. The navigation functions and features may include destination selection 32 (identifying one or more places to be used as a destination based on user input), route calculation 34 (determining a route from an origin to a destination), route guidance 36 (providing detailed directions for reaching a destination), map display 38, and positioning 40 (e.g., map matching). Other functions and programming 42 may be included in the navigation system 10.

The navigation application software programs 20 may be written in a suitable computer programming language such as C, although other programming languages, such as C++ or Java, are also suitable. All of the components described above may be conventional (or other than conventional) and the manufacture and use of these components are known to those of skill in the art.

II. Geographic Database

Figure 2:
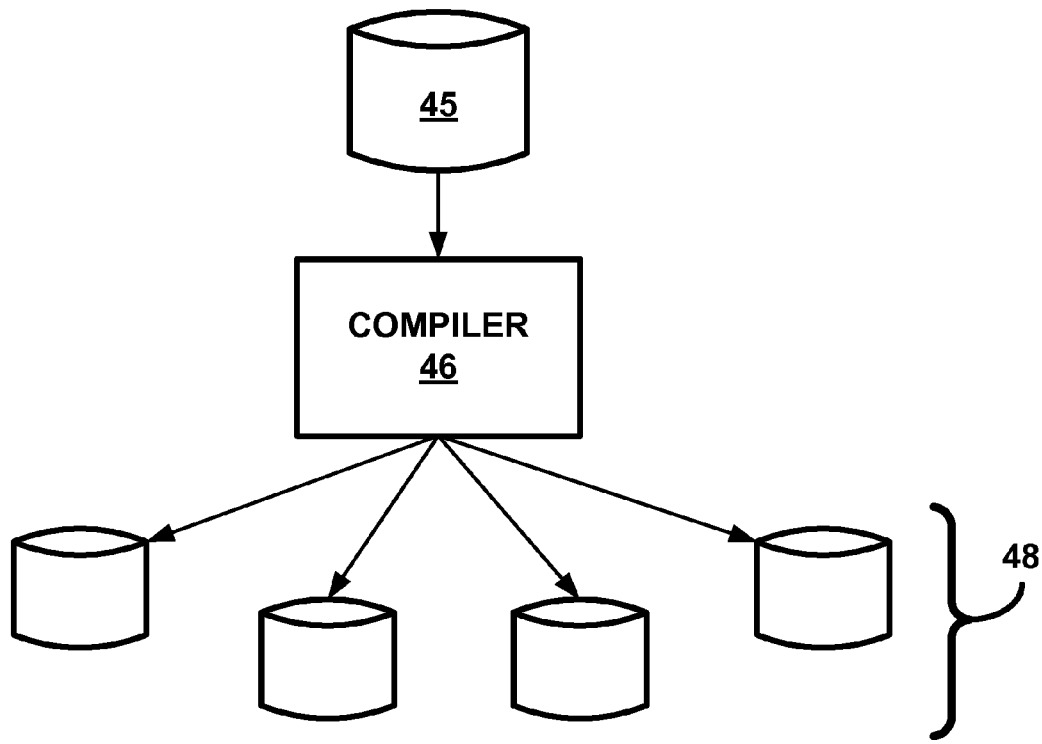
FIG. 2 is a block diagram that illustrates forming geographic database products from a master version of a geographic database; according to an example.

The geographic database 26 is a compiled database product, which is produced directly or indirectly from a master version of a geographic database. FIG. 2 shows a master version of a geographic database 45. The master version of the geographic database 45 contains data that represent geographic features in a coverage area. The coverage area may correspond to an entire country, such as the United States. Alternatively, the coverage area may correspond to several countries, such as the United States, Canada, and Mexico, or France, Germany, and Italy, and so on. According to another alternative, the coverage area of the master version of the geographic database 45 may represent only a single region within a country, such as the West Coast or the Midwest of the U.S. Although the master version of the geographic database 45 includes data that represent geographic features in the entire coverage area, there may be parts of the coverage area that contain geographic features that are not represented by data in the geographic database, or for which the representation of geographic features is sparse.

The master version of the geographic database 45 includes data about a road network located in the coverage area. The data about the road network include various kinds of information, such as the geographic coordinates of positions of the roads, street names of the roads, addresses ranges along the roads, turn restrictions at intersections of roads, and so on. The master version of the geographic database 45 also includes data about points of interest in the covered area. Points of interest may include hotels, restaurants, museums, stadiums, offices, automobile dealerships, auto repair shops, etc. The master version of the geographic database 45 may include data about the locations of these points of interests. The master version of the geographic database 45 may also include data about places, such as cities, towns, or other communities. The master version of the geographic database 45 may include other kinds of information.

The master version of the geographic database 45 is maintained as the copy that has the most up-to-date data relating to the coverage area. Accordingly, the master version of the geographic database 45 is updated, expanded, and/or otherwise modified on a regular and continuing basis. To facilitate these operations, the master version of the geographic database 45 is stored in a format that facilitates updating, maintenance, and development. For example, the data in the master version 45 may be uncompressed. Examples of suitable formats include Oracle Spatial and VSAM although other formats, both proprietary and non-proprietary, including GDF, may be suitable. In general, the format of the master database 45 is not suitable for use in systems that provide navigation functions, such as navigation systems.

The master version of the geographic database 45 is used to make compiled database products 48, one example of which is the geographic database 26 depicted in FIG. 1. In one method of operation, data from the master version of the geographic database 45 is first compiled into an intermediate or delivery format, such as GDF. Then, the database in the delivery format is used to make the compiled database products 48. The compiled database products 48 are made using a compiler 46. The compiler 46 is a software program run on an appropriate computer platform. The compiler 46 obtains geographic data from the intermediate format database (which was formed from the master geographic database 45) and organizes the data into a format (or formats) to produce the compiled (or working) version of the geographic databases 48. The format of the compiled geographic databases 48 facilitates use of the geographic data in the end users' systems for navigation-related purposes.

The compiled database products 48 may include only portions of all the data in the master version of the geographic database 45. For example, the compiled database products 48 may include data that relate to only one or more specific sub-areas within the coverage area of the master version of the geographic database 45. Further, the compiled database products 48 may include fewer than all the data attributes that describe geographic features represented in the master version of the geographic database 45.

The compiled database products 48 are used on various kinds of computing platforms. For example, the compiled database products 48 are used in navigation systems (such as in-vehicle navigation systems and hand-held portable navigation systems), personal computers (including desktop and notebook computers), and other kinds of devices, such as pagers, telephones, personal digital assistants, tablets, smartphones, etc. The compiled database products 48 are also used on networked computing platforms and environments, including systems connected to the Internet.

The compiled database products 48 are stored on media that are suitable for the hardware platforms on which they are used. For example, the compiled database products may be stored on CD-ROM disks, hard drives, DVD disks, flash memory, or other types of media that are available now or that become available in the future.

In the compiled databases 48, the geographic data are organized differently than in the master version of the geographic database 45. A compiled database is organized, arranged, structured and stored in a form that facilitates the use of the data in the computing platform in which it is installed. A compiled database 48 may also be stored in a compressed format on the media on which it is located. An example of how the road network is represented in a compiled database product 48 is provided with reference to FIGS. 3 and 4.

Figure 3:
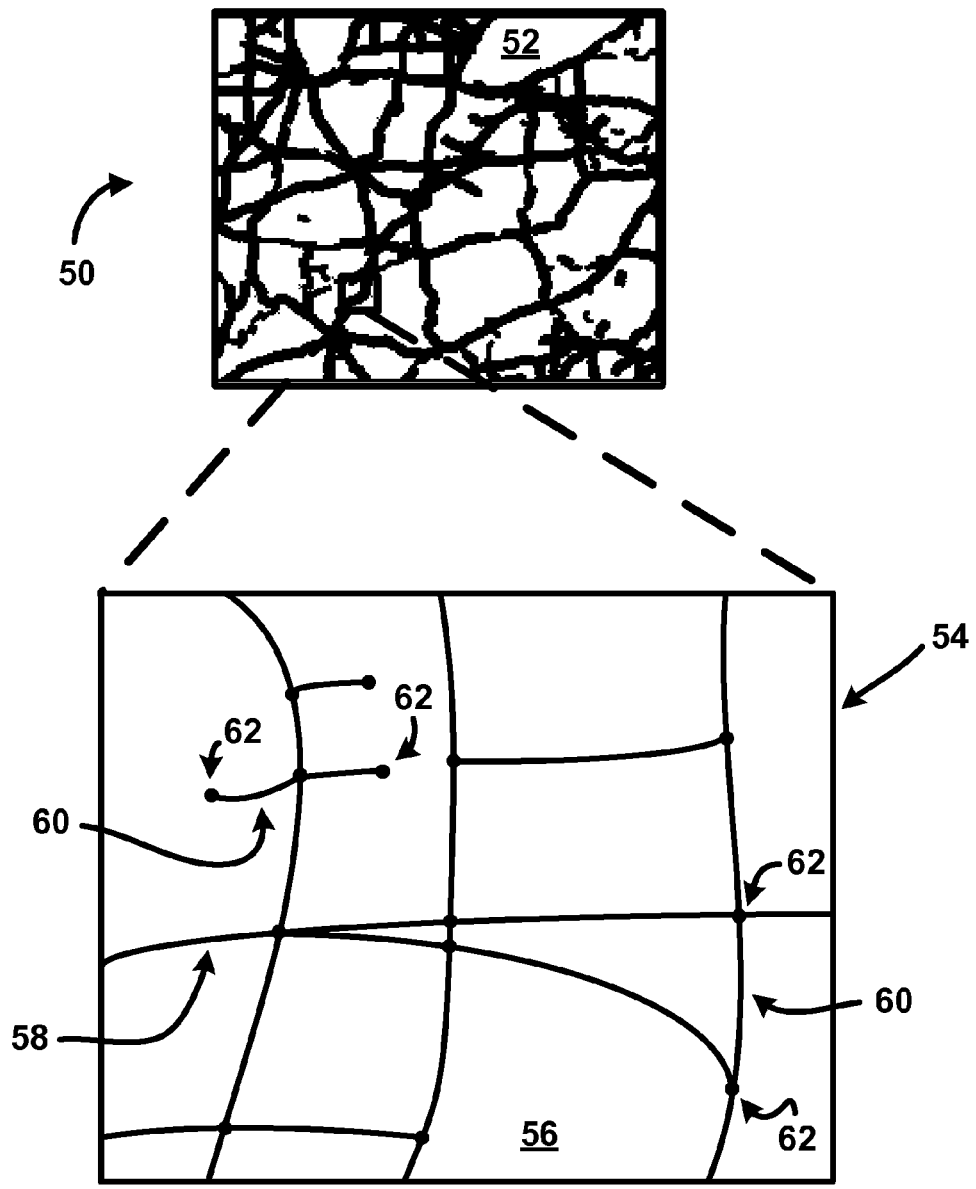
FIG. 3 depicts a map of a geographic region, according to an example.

FIG. 3 shows a map 50 of a geographic region 52. The geographic region 52 may correspond to a metropolitan or rural area, a state, a country, or combinations thereof, or any other area of comparable size. Located in the geographic region 52 are physical geographic features, such as roads, points of interest (including businesses, facilities, etc.), lakes, rivers, railroads, municipalities, etc.

FIG. 3 also includes an enlarged map 54 of a portion 56 of the geographic region 52. The enlarged map 54 illustrates part of the road network 58 in the geographic region 52. The road network 58 includes, among other things, roads and intersections located in the geographic region 52. As shown in the portion 56, each road in the geographic region 52 is composed of one or more road segments 60. A road segment 60 represents a portion of the road. Each road segment 60 is shown to have associated with it two nodes 62; one node represents the point at one end of the road segment and the other node represents the point at the other end of the road segment. The node at either end of a road segment may correspond to a location at which the road meets another road, i.e., an intersection, or where the road dead-ends.

Figure 4:
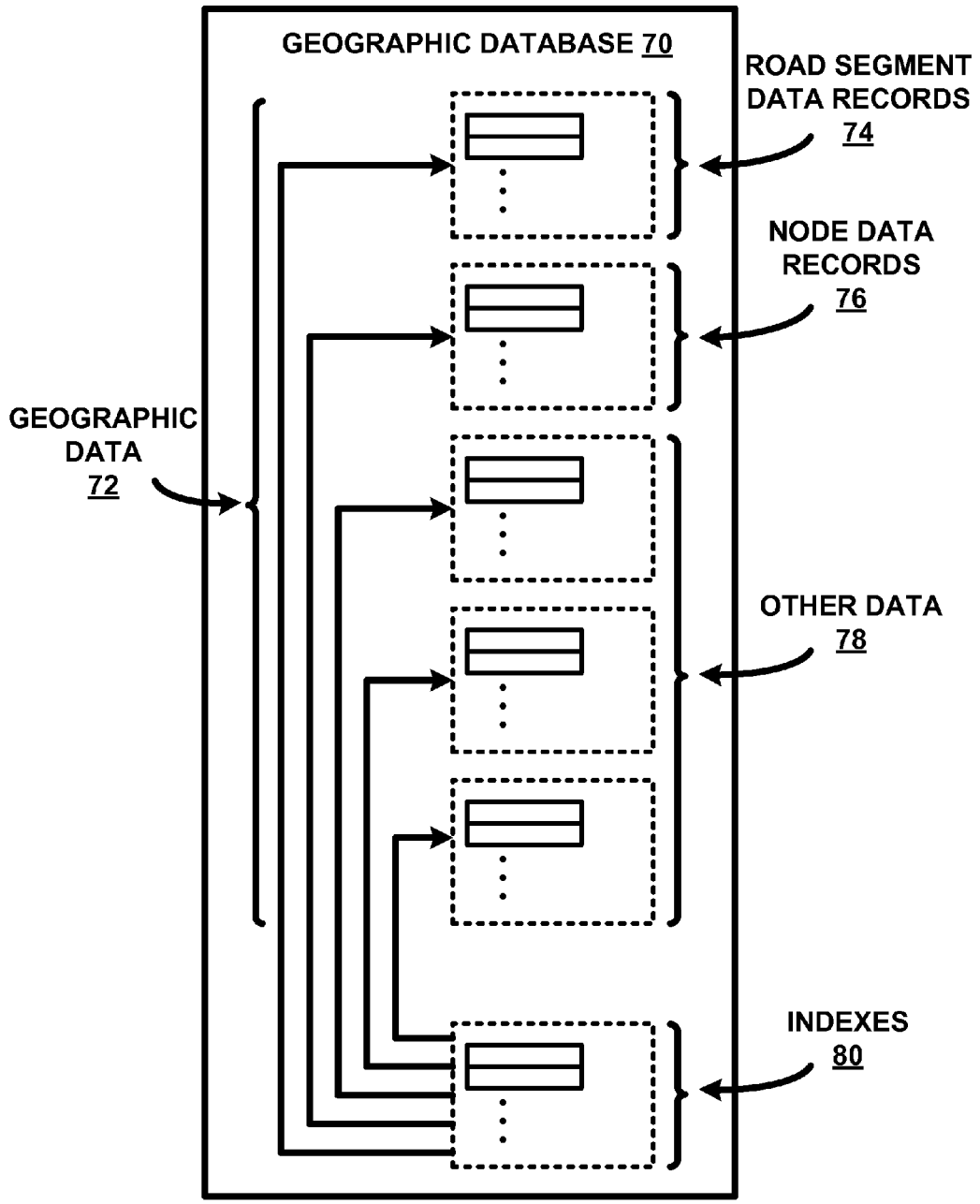
FIG. 4 is a block diagram of a geographic database that represents the geographic region of FIG. 3, according to an example.

Referring to FIG. 4, a geographic database 70 contains data 72 that represents some of the physical geographic features in the geographic region (52 in FIG. 3). The geographic database 70 may constitute all or part of the geographic database 26. For example, the geographic database 70 may be a subset of the data contained within the geographic database 26. The geographic database 70 may be accessible through the navigation system 10 and the computing platform 12. Alternatively or additionally, the geographic database 70 may be a standalone database located remotely from the geographic database 26, the navigation system 10, and/or the computing platform 12 but nonetheless accessible via the communication system 30 and/or the processor 14.

The data 72 contained in the geographic database 70 includes data that represent the road network 58. In the embodiment of FIG. 4, the geographic database 70 that represents the geographic region 52 contains at least one database record 74 (also referred to as "entity" or "entry") for each road segment 60 in the geographic region 52 in FIG. 3. The road segment data record 74 may include a segment ID by which the data record can be identified in the geographic database 70.

Each road segment data record 74 has associated with it information (such as "attributes", "fields", etc.) that describes features of the represented road segment. The road segment data record 74 may include data that indicate the restrictions, if any, on the direction of vehicular travel permitted on the represented road segment, data indicating a speed limit or speed category (i.e., the maximum permitted vehicular speed of travel) on the represented road segment, data indicating whether the represented road segment is part of a controlled access road (such as an expressway), a ramp to a controlled access road, a bridge, a tunnel, a toll road, a ferry, and so on.

The road segment data record 74 also includes data providing the geographic coordinates (e.g., the latitude and longitude) of the endpoints of the represented road segment and data providing the shape of the road segment. In one embodiment, the endpoint data are references to the node data records 76 that represent the nodes corresponding to the endpoints of the represented road segment.

The road segment data record 74 may also include or be associated with other data that refer to various other attributes of the represented road segment. The various attributes associated with a road segment may be included in a single road segment record, or may be included in more than one type of record that are cross-referenced to each other. For example, the road segment data record 74 may include data identifying what turn restrictions exist at each of the nodes that correspond to intersections at the ends of the road portion represented by the road segment, the name or names by which the represented road segment is known, the street address ranges along the represented road segment, and so on.

The geographic database 70 that represents the geographic region 52 also includes a database record 76 (or "entity" or "entry") for each node 62 in the geographic region 52. (The terms "nodes" and "segments" represent only one terminology for describing these physical geographic features and other terminology for describing these features is intended to be encompassed within the scope of these concepts). Each of the node data records 76 may have associated information (such as "attributes", "fields", etc.) that allows identification of the road segment(s) that connect to it and/or its geographic position (e.g., its latitude and longitude coordinates).

The geographic database 70 may also include other kinds of data 78. The other kinds of data 78 may represent other kinds of geographic features or anything else. The other kinds of data may include point of interest (POI) data. For example, the point of interest data may include point of interest records comprising a type (e.g., the type of point of interest, such as restaurant, hotel, city hall, police station, historical marker, ATM, golf course, etc.), location of the point of interest, a phone number, hours of operation, etc. Each point of interest has a unique physical location and each of the locations can be identified by its two dimensional (or three dimensional) geographic coordinates, (i.e., latitude, longitude, and optionally altitude). Additionally, the locations may correspond to one of the nodes or may correspond to a point along a road segment.

The geographic database 70 also includes indexes 80. The indexes 80 may include various types of indexes that relate the different types of data to each other or that relate to other aspects of the data contained in the geographic database 70. One of the indexes is a full text search index, which is described with respect to FIGS. 5-10.

III. Full Text Search System

A. Overview

Figure 5:
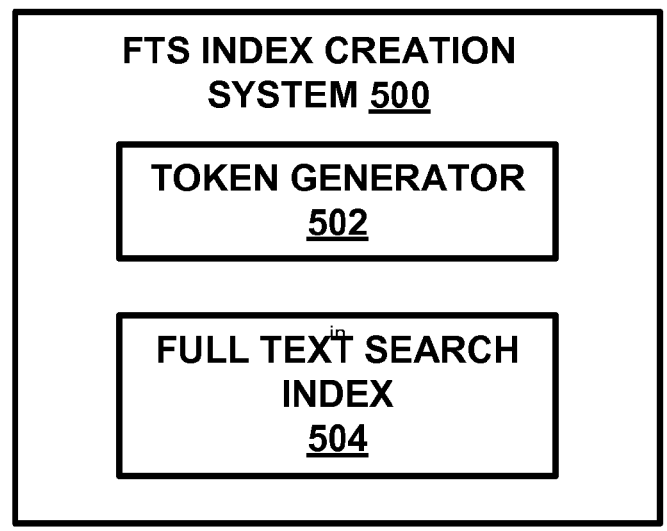
FIG. 5 is a block diagram of a full text search system, according to an example.

FIG. 5 is a block diagram of a full text search (FTS) index creation system 500. The FTS index creation system 500 may be embodied as program instructions stored on a non-transitory computer-readable medium (CRM), which when executed by a processor cause the processor to carry out functions as described further herein. The FTS index creation system 500 may be embodied as a processor coupled to memory storage. The memory storage may have stored thereon program instructions, which, when executed by the processor, cause the FTS index creation system 500 to carry out functions as described herein. Any such program instructions may be written in a suitable computer programming language, such as C, C++, Java, or any other suitable program language now known or later developed. In the navigation system example, the FTS index creation system 500 may be part of or accessible to the compiler 46.

The FTS index creation system 500 includes a token generator 502 and a full text search index 504. The token generator 502 may be implemented as a software sub-module or a collection of program instructions. The token generator 502 generates interwoven data tokens based on an input of two or more data tokens as further described with reference to FIGS. 6-8.

FTS systems search for relevant documents based on the entered data tokens. The term document in this context means any kind of electronic data record or file that contains text. In the example of a navigation system, relevant documents may be a segment, node, point of interest, or other record stored in a geographic database.

The full text search index 504 associates document identifiers with interwoven data tokens generated by the token generator 502. For example, the full text search index 504 may be a virtual table similar to the FTS index used in FTS3. FTS3 is the full text search extension of SQLite (http://www.sqlite.org/cvstrac/wiki?p=FtsUsage).

In FTS3, each FTS index is modeled as a virtual table. The virtual table VT(id,att1, . . . , attn) contains a document identifier "id" and one or more data fields called attributes "att1, . . . , attn." FTS3 allows a user to retrieve documents where query tokens occur in any of the attributes or in specific attributes.

B. Index Creation

In the navigation system example, index creation may occur during the compilation process of generating geographic database products as shown in FIG. 2. In other examples, the index may be created and stored on any computing platform prior to operation (i.e., querying) of the FTS system.

Table 1 is a virtual table that associates point of interest identifiers (POIID) with data tokens (DATA). Table 1 shows data for two points of interest. In practice, however, the VT_POI virtual table may have many more records than the two depicted.

TABLE 1

| VT_POI | |
|---|---|
| POIID | DATA |
| 1 | Navteq |
| | Otto-Volger-Strasse 1 |
| | 65843 Sulzbach |
| | Deutschland |
| 2 | Pizzeria Claudio |
| | Schwabstrasse 45 |
| | 72297 Seewald |
| . . . | . . . |

Both points of interest represented in the VT_POI virtual table are associated with a number of tokens listed in the DATA column. For example, POI 1 is associated with eight data tokens: "Navteq," "Otto," "Volger," "Strasse," "1," "65843," "Sulzbach," and "Deutschland." POI 2 is associated with six data tokens: "Pizzeria," "Claudio," "Schwabstrasse," "45," "72297," and "Seewald."

An inverted index may index each data token in the DATA column by assigning to each data token (e.g., Pizzeria, Navteq, Deutschland, etc.) a list of documents where this term appears. This may enable an FTS system to issue queries similar to Query 1 and Query 2 as follows.

---

Query 1: SELECT * FROM VT_POI WHERE VT_POI match "Deutschland Volger"
Query 2: SELECT * FROM VT_POI WHERE VT_POI match "Deut* Volg*"

---

In response to Query 1, the FTS system retrieves all documents that include both tokens "Deutschland" and "Volger." In response to Query 2, the FTS system retrieves all documents that include one data token that begins with "Deut" and ends with anything and another token that begins with "Volg" and ends with anything. In most instances, Query 2 will return more results than Query 1 because Query 2 is broader. For example, Query 2 may return a document that has data tokens "Deutschmark" and "Volg-Laden," while Query 1 would not.

As previously described, Query 1 and Query 2 work somewhat slowly because the data token "Deutschland" is rather unselective. That is, there are probably many points of interest in the VT_POI virtual table associated with the data token "Deutschland." Consequently, in response to Query 1, the FTS system will sort through all the POIs to determine which POIs are described by the data token "Deutschland." Then, the FTS system will sort through all of those POIs that are described by "Deutschland" to determine which are also described by the data token "Volger."

To overcome problems associated with unselective tokens, the FTS index creation system 500 generates interwoven data tokens that may be more selective than the existing data tokens, such as those depicted in Table 1. The interwoven data tokens are generated using a combination of two or more of the existing data tokens.

Figure 6:
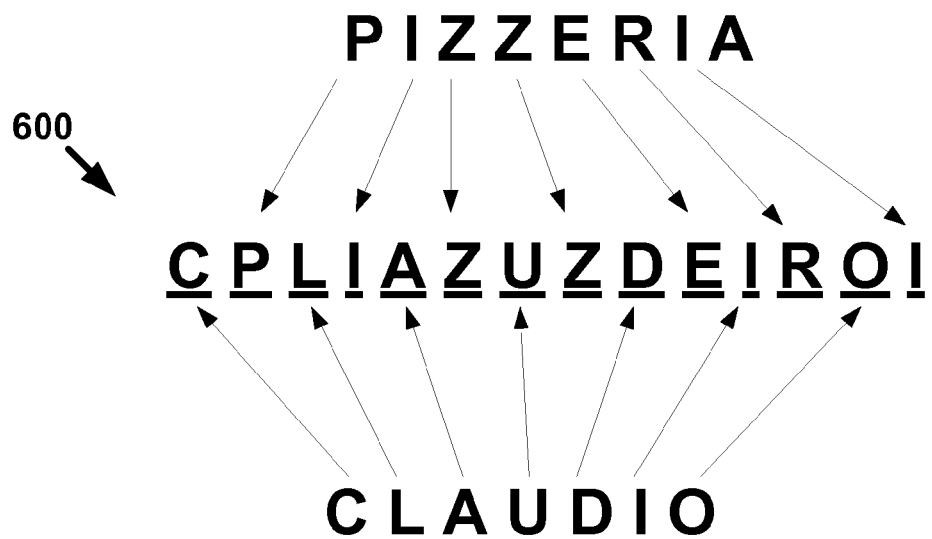
FIG. 6 depicts an interwoven data token, according to an example.

FIG. 6 shows an interwoven data token 600 generated from two data tokens. The interwoven data token 600 is a combination of two data tokens that are each associated with POI 2, namely "Pizzeria" and "Claudio." An interwoven data token, such as the interwoven data token 600, is generated by interweaving single characters from "Claudio" with single characters from "Pizzeria" until all of the characters from one of the data tokens have been used. Thus, the generated interwoven data token becomes "CPLIAZUZDEIROI."

The 'A' from "Pizzeria" was not used in the interwoven data token 600 because all of the characters from "Claudio" were used and 'A' was not needed. For example, once the 'O' from "Claudio" was used, the 'I' from "Pizzeria" was used. At this point, all the characters from "Claudio" were used and generation of the interwoven data token 600 ends.

An interwoven data token starting with the 'P' from "Pizzeria," rather than the 'C' from "Claudio" is different than the interwoven data token 600. Thus, it may be helpful to organize the two data tokens into lexicographical order and start with a character from the higher-ordered data token ("Claudio" in this example, rather than "Pizzeria"). This may facilitate generating the same interwoven data token given the same two data tokens. Alternatively, both versions may be generated.

The above description is just one method of generating an interwoven data token and other methods of generating interwoven data tokens exist. For instance, interwoven data tokens may not alternate between a single character from a first data token and a single character of a second data token, but instead alternate between two (or more) characters of each individual data token. Alternatively, an interwoven data token may alternate different numbers of characters from each individual data token, such as one character from the first data token and two characters from the second data token. Furthermore, an interwoven data token may be generated from three or more individual data tokens. Additional methods of generating interwoven data tokens will become apparent to those skilled in the art given the entirety of this disclosure.

Figure 7:
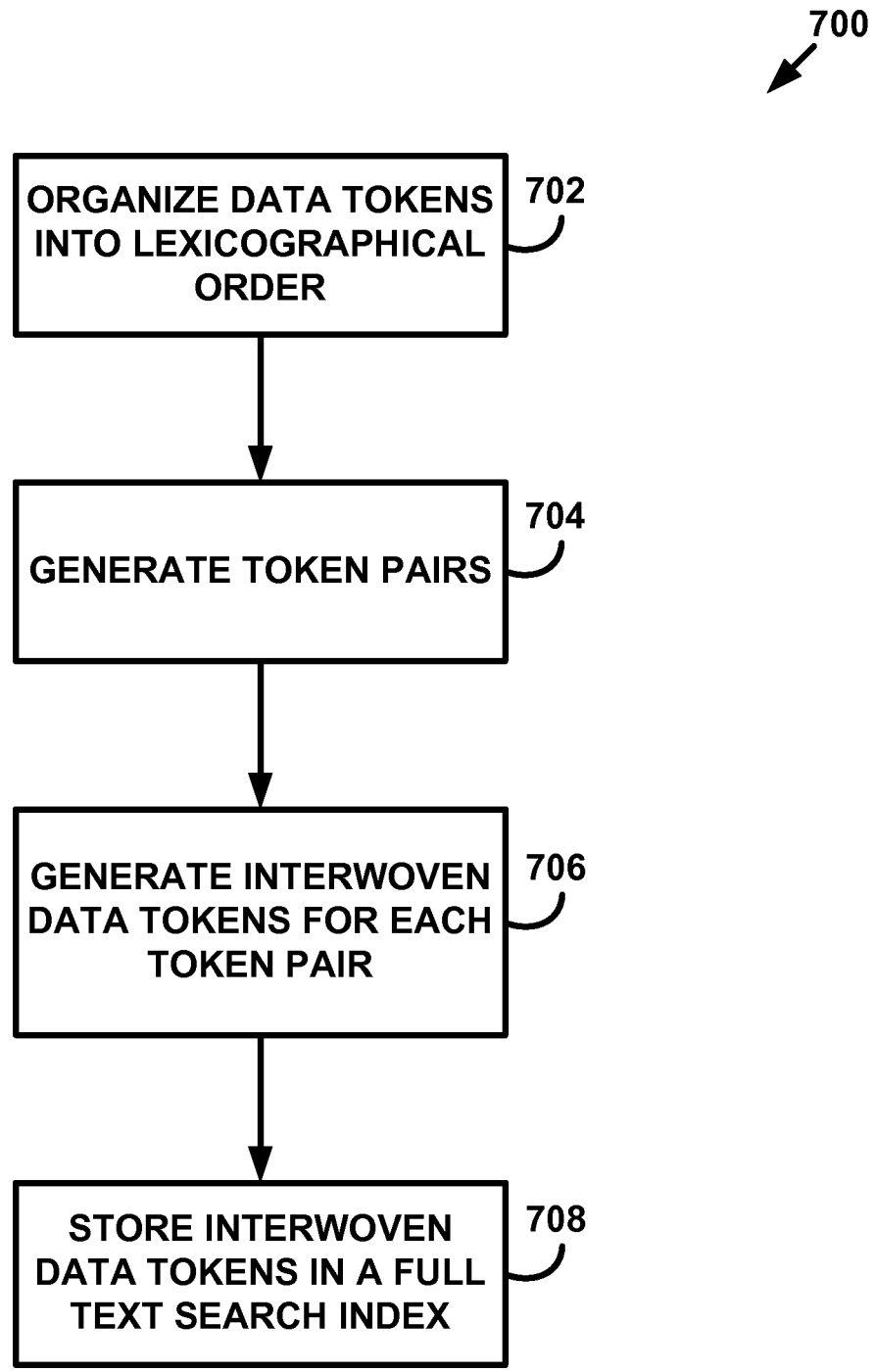
FIG. 7 is a flow diagram of a method of creating a full text search index, according to an example.

FIG. 7 is a flow diagram of a method 700 for facilitating a full text search by generating interwoven data tokens for a point of interest. At block 702, the token generator 402 organizes data tokens associated with a point of interest into lexicographical order. For example, the token generator 502 may arrange the six data tokens of POI 2 shown in Table 1 into lexicographical order as shown in FIG. 8A.

At block 704, the token generator 502 generates token pairs from the lexicographically-ordered set of data tokens. The token pairs are generated by separately combining the first data token with each subsequent data token, individually combining the second data token with each subsequent data token, individually combining the third data token with each subsequent data token, and so on. For example, the token generator 502 generates the token pairs shown in FIG. 8B from the lexicographically-ordered set of data tokens shown in FIG. 8A.

In FIG. 8B, the first data token, "45" is separately combined with each of the five subsequent data tokens: "72297," "Claudio," "Pizzeria," "Schwabstrasse," and "Seewald." The second data token, "72297" is separately combined with each of the four subsequent data tokens: "Claudio," "Pizzeria," "Schwabstrasse," and "Seewald." The third data token, "Claudio" is separately combined with each of the three subsequent data tokens: "Pizzeria," "Schwabstrasse," and "Seewald." The fourth data token "Pizzeria" is separately combined with each of the two subsequent data tokens: "Schwabstrasse" and "Seewald." The fifth data token "Schwabstrasse" is combined with the one subsequent data token: "Seewald."

In any set of n tokens, there will be $$\frac{n*(n-1)}{2}$$

token pairs. In the example illustrated by FIGS. 8A-B, there are six data tokens and, therefore, fifteen token pairs.

At block 706, the token generator 502 generates interwoven data tokens for each of the generated token pairs. For a given token pair, the token generator 502 generates the interwoven data token by interweaving characters of the first data token of the pair with characters of the second data token of the pair. According to one example, an interwoven data token is specifically generated by starting with the first data token in a token pair and alternating single characters of the first data token with single characters of the second data token of the pair. Once the last character from the first or second data token is used, the interwoven data token is completed with the next character from the other data token. Any remaining characters from the other data token after that are not used.

For example, FIG. 8C shows interwoven data tokens for each of the token pairs shown in FIG. 8B. Focusing on the first token pair (45 & 72297), the token generator 402 generates an interwoven token pair by taking the first character of the first data token ('4' from "45"), the first character of the second data token ('7' from "72297"), the second character of the first data token ('5' from "45") and the second character of the second data token ('2' from "72297"). At this point, there are no more unused characters from the first data token so the interwoven token generation ends with "4752." Those skilled in the art will understand that this interwoven data token and the remaining interwoven data tokens shown in FIG. 8C are merely examples and interwoven data tokens based on each token pair can be generated according to other methods, which will become apparent given the entirety of this disclosure.

At block 708, the token generator 502 stores the interwoven data tokens in the full text search index 504. For example, the token generator 502 may store the interwoven data tokens in the INTERWOVEN_DATA_TOKENS column of Table 2.

Table 2 shows the interwoven data tokens from FIG. 8C stored in the INTERWOVEN_DATA_TOKENS column for POI 2. Table 2 also shows interwoven data tokens stored in the INTERWOVEN_DATA_TOKENS column for POI 1, which may be generated based on the eight data tokens of POI 1. The interwoven data tokens may be used to search for documents, such as the point of interest records stored in the geographic database 26. Moreover, the interwoven data tokens may be somewhat more selective than the data tokens located in the DATA column.

TABLE 2

VT_POI

| POIID | DATA | INTERWOVEN_DATA_TOKENS |
|---|---|---|
| 1 | Navteq<br>Otto-Volger-Strasse 1<br>65843 Sulzbach<br>Deutschland | 16 1D 1N 1O 1V 1S<br>6D5E8U4T3S 6N5A8V4T3E<br>6O5T8T4O3 6V5O8L4G3E<br>6S5T8R4A3S 6S5U8L4Z3B<br>DNEAUVTTSECQH DOETUTTOS<br>DVEOULTGSECRH<br>DSETURTASSCSHEL<br>DSEUULTZSBCAHCLHA<br>NOATVTTOE NVAOVLTGEEQR<br>NSATVRTAESQS NSAUVLTZEBQA<br>OVTOTLOG OSTTTROA<br>OSTUTLOZ<br>VSOTLRGAESRS VSOULLGZEBRA<br>SSTURLAZSBSAEC |
| 2 | Pizzeria Claudio<br>Schwabstrasse 45<br>72297 Seewald | 4752 4C5L 4P5I 4S5C 4S5E<br>7C2L2A9U7D 7P2I2Z9Z7E<br>7S2C2H9W7A 7S2E2E9W7A<br>CPLIAZUZDEIROI<br>CSLCAHUWDAIBOS<br>CSLEAEUWDAILOD<br>PSICZHZWEARBISAT<br>PSIEZEZWEARLIDA<br>SSCEHEWWAABLSDT |
| ... | ... | ... |

C. Query Processing

Figure 9:
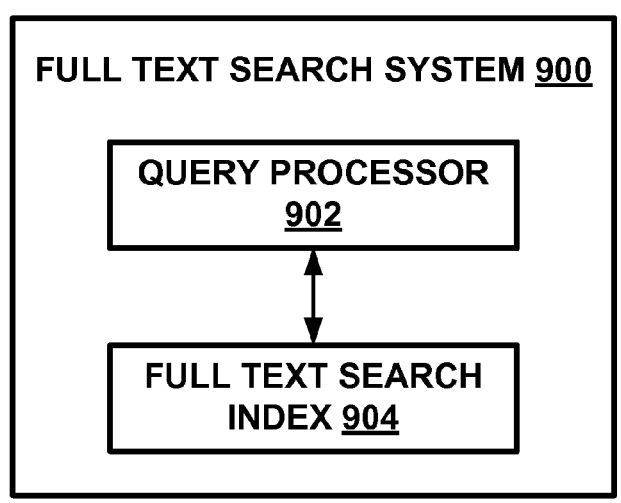
FIG. 9 is a block diagram of a full text search system, according to another example.

FIG. 9 is a block diagram of a full text search (FTS) system 900. The FTS system 900 includes a query processor 902 and a full text search index 904. The full text search index 904 may be a copy of the full text search index 504 generated using the method 700. As previously described, in the navigation system example, the full text search index 904 may be included in the indexes 80.

The query processor 902 may be embodied as program instructions stored on a non-transitory computer-readable medium, which when executed by a processor cause the processor to carry out function as described further herein. Any such program instructions may be written in a suitable computer programming language such as C, C++, Java, or any other suitable program language now known or later developed.

In the navigation system example, the query processor 902 may be part of the navigation programs 20 contained within the non-volatile memory 18 of the navigation system 10. For example, the query processor 902 may be used in the navigation system 10 as part of destination selection. In this example, some or all of the query processor 902 may be included as part of the destination selection program 32.

The FTS index creation system 500 and the FTS system 900 may be combined into a single FTS system. They are shown separately because some functions of the query processor 902 are not needed during index creation and some functions of the token generator 502 are not needed during query processing. Additionally, as described with the navigation system example, the components of the FTS index creation system 500, 900 do not need to be co-located as shown in FIGS. 5 and 9. The full text search index 904 may be the same as the full text search index 504 once the index creation process is completed.

Figure 10:
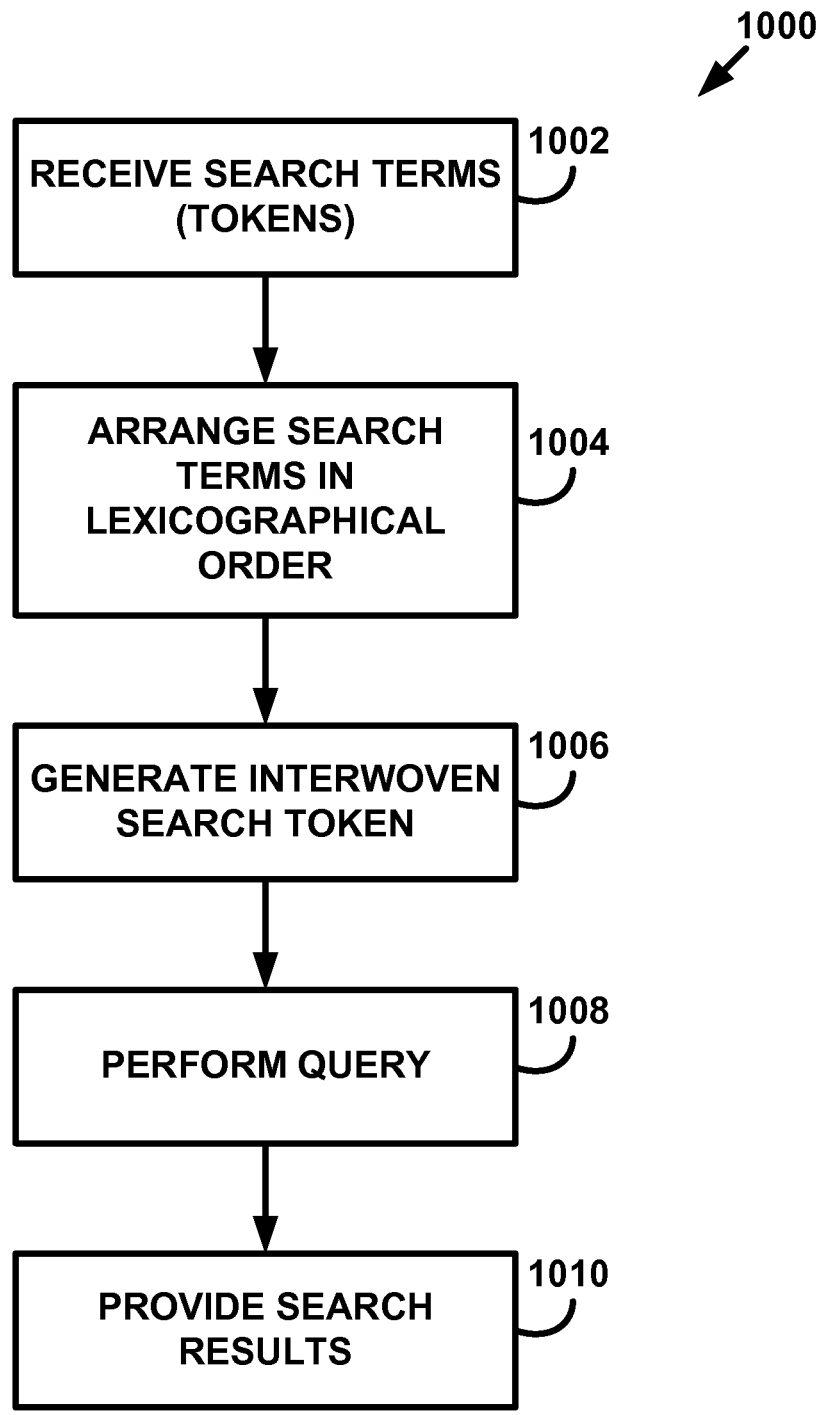
FIG. 10 is a flow diagram of a method of performing a full text search, according to an example.

FIG. 10 is a flow diagram of a method 1000 for facilitating full text search. At block 1002, the FTS system 900 receives search terms (sometimes referred to as tokens) from a user. For example, the user may be a user of the navigation system 10 and the query terms are words that relate to a desired destination and/or point of interest (e.g., street name, point of interest name, category, or part of an address). The user may enter the search terms via the user interface 24.

At block 1004, the query processor 902 arranges the received search terms into a lexicographically-ordered set of search terms. For example, if the received search terms are "VOLGER," and "DEUTSCHLAND," the query processor 902 may arrange these terms into a set in which the first search term is "DEUTSCHLAND" and the second search term is "VOLGER."

At block 1006, the query processor 902 generates an interwoven data token for each unique pair of search terms in the lexicographically-ordered set. The query processor 902 may generate the interwoven data tokens according to the same method described above with respect to method 700. For example, based on the set of search terms "DEUTSCHLAND" and "VOLGER," the query processor 902 may generate the interwoven data token "DVEOULTGSECRH."

According to the expression mentioned above, for any n data tokens, there will be $$\frac{n*(n-1)}{2}$$

token pairs. Therefore, if a user entered three search terms, "65843," "DEUTSCHLAND," and "VOLGER," there will be three token pairs and, therefore, three generated interwoven data tokens.

At block 1008, the query processor 902 performs a query of the full text search index 904 using the interwoven data tokens generated at block 1006. For example, the query processor 902 may perform a query using the interwoven data token "DVEOULTGSECRH," which was generated based on the received search terms "DEUTSCHLAND" and "VOLGER." In response to a query for "DVEOULTGSECRH," the FTS system 900 may identify POI 1 from the VT_POI virtual table because POI 1 has associated with it the interwoven data token "DVEOULTGSECRH."

Such a query may take the following form.
SELECT data FROM VT_POI WHERE VT_POI match "DVEOULTGSECRH" The interwoven data token "DVEOULTGSECRH" may be more selective than the individual query terms "DEUTSCHLAND" and "VOLGER." Therefore, this query may be generally more efficient than a query taking the following form.

SELECT data FROM VT_POI WHERE VT_POI match
"DEUTSCHLAND VOLGER"

These examples and other examples provided herein use SQLite syntax. However, depending on the implementation, other suitable commands and data structures may be used as well.

At block 1010, the query processor 902 provides the result set of document identifiers associated with the queried interwoven data token. The query processor 902 may provide the result set to another system, which then retrieves the documents and provides the documents to the user. Alternatively, the query processor 902 may retrieve the documents associated with the document identifier and then provide the documents to the user.

For example, the query processor 902 may provide the point of interest identifier, POI 1, to the map display application 38, which then retrieves data from the geographic database 26 associated with POI 1. The map display application 38 may then display a map that identifies a location and possibly other data associated with POI 1 on the user interface 24.

D. Additional Examples

Several other queries are possible depending on the type and number of search terms a user enters and the FTS system 900 consequently receives at block 1002. According to one example, a user may enter token prefixes rather than entire tokens. For instance, a user may enter "DEU*" rather than "DEUTSCHLAND," and "VOL*" rather than "VOLGER." In response, the FTS system 900 may generate an interwoven data token "DVEOUL*" and issue the following query.

SELECT data FROM VT_POI WHERE VT_POI match "DVEOUL*" Such a query remains efficient as the interwoven query token "DVEOUL*" is still rather selective.

According to another example and depending on the types of queries recognized by the system, the FTS system 900 may issue a query that is specific to the INTERWOVEN_DATA_TOKENS column. A query of this type may resemble the following query.

```
SELECT data FROM VT_POI WHERE VT_POI match
"INTERWOVEN_DATA_TOKENS: DVEOUL*"
```

Such a query would only report results if the query token ("DVEOUL") appears in the INTERWOVEN_DATA_TOKENS column and would not report any results in which the query token appears in the DATA column unless it also appeared in the INTERWOVEN_DATA_TOKENS column.

According to another example, a user may enter three or more search terms, which, by way of example, may be "DEU*," "VOL*," and "65843." The FTS system 900 may generate interwoven data tokens from these three search terms resulting in "6D5E8U4*," "6V5O8L4*," and "DVEOUL*." The FTS system 900 may then issue a query using these three search terms as follows.

```
SELECT data FROM VT_POI WHERE VT_POI match
"INTERWOVEN_DATA_TOKENS: 6D5E8U4* 6V5O8L4*
DVEOUL*"
```

In response to such a query, the FTS system 900 may return any document that is associated with all three of the interwoven data tokens. Such a query may be more selective than the following query.

```
SELECT data FROM VT_POI WHERE VT_POI match "Data:
DEU* VOL* 65843"
```

IV. Alternative Embodiments

One more of the following alternative embodiments may be used in place of or in combination with any of the above-disclosed embodiments as well as any of the hereinafter-described alternative embodiments as appropriate.

A. Interwoven Token Truncation

The generation and storage of interwoven data tokens for each point of interest in the full text search index 504, 904 may contribute to an increased data size, which may have several negative consequences including added cost and processing time. In order to combat this increase in size, the FTS index creation system 500, 900 may facilitate truncation of interwoven data tokens that are over m characters in size. Thus, the overall size introduced by the generated tokens may be limited to m*n*(n−1)/2, where m denotes the maximum length of the generated token and n the average number of tokens per document.

For example, Table 3 shows the VT_POI virtual table with m set to 6. As seen, all of the interwoven data tokens are truncated after six characters.

TABLE 3

| | VT_POI | |
|---|---|---|
| POIID | DATA | INTERWOVEN_DATA_TOKENS |
| 1 | Navteq Otto-Volger-Strasse 1 65843 Sulzbach Deutschland | 16 1D 1N 1O 1V 1S 6D5E8U 6N5A8V 6O5T8T 6V5O8L 6S5T8R 6S5U8L DNEAUV DOETUT DVEOUL DSETUR DSEUUL NOATVT NVAOVL NSATVR NSAUVL OVTOTL OSTTTR OSTUTL VSOTLR VSOULL SSTURL |
| 2 | Pizzeria Claudio Schwabstrasse 45 72297 Seewald | 4752 4C5L 4P5I 4S5C 4S5E 7C2L2A 7P2I2Z 7S2C2H 7S2E2E CPLIAZ CSLCAH CSLEAE PSICZH PSIEZE SSCEHE |
| ... | ... | ... |

Depending on the implementation, the value of m may be stored in the metadata of the full text search index 504, 904. An interwoven token may be truncated upon generation or, alternatively, upon storage in the full text search index 504, 904.

According to one example query method, a user may enter the search terms "DEUTSC" and "VOLG." Consequently, the FTS system 900 may receive the search terms. Upon receipt of the search terms, the FTS system 900 may order the terms lexicographically and retrieve the value of m from the metadata of the full text search index 404. Once the value of m is received, the FTS system 900 may generate the interwoven data token "DVEOUL" and issue a modified query as follows.

```
SELECT data FROM VT_POI WHERE VT_POI match "DVEOUL*"
AND DATA LIKE '%DEUTSC%' AND DATA LIKE '%VOLG%'
```

A query such as this would retrieve all results associated with the interwoven data token "DVEOUL" and then refine these results without index support using the subsequent LIKE sub-clause.

B. Token Triples

As described above, interwoven data tokens may be generated based on two or more underlying data tokens. Interwoven data tokens generated based on three or more data tokens may be somewhat more selective than interwoven data tokens generated based on only two data tokens. Therefore, depending on the implementation, some systems may store interwoven data tokens based on three data tokens in place of or in addition to interwoven data tokens generated based on two data tokens.

Table 4 shows the VT_POI virtual table with an added column for interwoven data tokens based on three underlying data tokens (sometimes referred to as a triple token). For brevity's sake, only eighteen token triples are shown for POI 1 and only ten token triples are shown for POI 2; however, many more may exist. The FTS index creation system 500, 900 may generate a triple token based on a first token, a second token, and a third token by interweaving single characters of the first data token with single characters of the second data token with single characters of the third data token.

TABLE 4

| | | VT_POI | |
|---|---|---|---|
| POIID | DATA | INTERWOVEN_DATA_TOKENS | TRIPLES |
| 1 | Navteq<br>Otto-Volger-Strasse 1<br>65843 Sulzbach<br>Deutschland | 16 1D 1N 1O 1V 1S 6D5E8U4T3S<br>6N5A8V4T3E 6O5T8T4O3<br>6V5O8L4G3E 6S5T8R4A3S<br>6S5U8L4Z3B<br>DNEAUVTTSECQH<br>DOETUTTOS<br>DVEOULTGSECRH<br>DSETURTASSCSHEL<br>DSEUULTZSBCAHCLHA<br>NOATVTTOE NVAOVLTGEEQR<br>NSATVRTAESQS<br>NSAUVLTZEBQA OVTOTLOG<br>OSTTTROA OSTUTLOZ<br>VSOTLRGAESRS<br>VSOULLGZEBRA<br>SSTURLAZSBSAEC | 16D 16N 16O 16V<br>16S 1DN 1DO 1DV<br>1DS 1NO 1NV 1NS<br>1OV 1OS 1SV 1SS<br>6DN5EA8UV4TT3SE<br>6NO5AT8VT4TO3E<br>... |
| 2 | Pizzeria Claudio<br>Schwabstrasse 45<br>72297 Seewald | 4752 4C5L 4P5I 4S5C 4S5E<br>7C2L2A9U7D 7P2I2Z9Z7E<br>7S2C2H9W7A 7S2E2E9W7A<br>CPLIAZUZDEIROI<br>CSLCAHUWDAIBOS<br>CSLEAEUWDAILOD<br>PSICZHZWEARBISAT<br>PSIEZEZWEARLIDA<br>SSCEHEWWAABLSDT | 47C52L 47P52I<br>47S52C 47S52E<br>4CP5LI 4CS5LC<br>4CS5LE 4PS5IC<br>4PS5IE 4SS5CE<br>... |
| ... | ... | ... | ... |

In particular, the first character of the interwoven data token is the first character of the first data token and every third character thereafter (e.g., the 4th character, the 7th character, the 10th character, and so on) is a character of the first data token. The second character of the interwoven data token is the first character of the second data token and every third character thereafter (e.g., the 5th character, 8th character, the 11th character, and so on) is a character of the second data token. And the third character of the interwoven data token is the first character of the third data token and every third character thereafter (e.g., the 6th character, the 9th character, the 12th character, and so on) is a character of the third data token. This is just one example of how to generate an interwoven data token from three underlying data tokens; however, other ways of generating triple tokens exist as well and are apparent given the entirety of this disclosure.

C. Proprietary Storage

The methods and systems described herein may also be utilized in conjunction with proprietary database structures or proprietary index structures. For example, the FTS index creation system 500, 900 may store generated interwoven tokens in a relational table of the form Tokens(InterwovenToken, DocumentID). Each generated interwoven token may occupy one record in such a table. In this approach, for example, a user may enter three search terms "DEU," "SULZ," and "OTTO." In response to receiving these tokens, the FTS system 900 may first generate the interwoven tokens "DSEUUL," "DOETUT," and "OSTUTLOZ." Then, the FTS system 900 may issue a query as follows.

```
SELECT DocumentID FROM Tokens WHERE InterwovenToken like
  'DSEUUL%'
INTERSECT
```

-continued

```
SELECT DocumentID FROM Tokens WHERE InterwovenToken like
  'DOETUT %'
INTERSECT
SELECT DocumentID FROM Tokens WHERE InterwovenToken like
  'OSTUTLOZ %'
```

Those skilled in the art will realize that this is an example utilizing one type of proprietary database structure and that the described methods and systems may be used in conjunction with other types of database structures. Depending on the implementation, such file structures may not be based on SQL, but instead on any suitable algorithm in accordance with the entirety of the present disclosure.

D. Fuzzy Search

The methods and systems described herein may also be utilized in conjunction with a technique called "approximate string matching," sometimes also referred to as "fuzzy search." The FTS index creation system 500, 900 may execute a known approximate string matching process of converting search terms into double metaphones. Double metaphones are used to account for ambiguous terms and multiple variants on surnames. For instance, as is known in the art, encoding the name "Smith" yields a primary code of "SM0" and a secondary code of "XMT." In accordance with the described systems and methods, the FTS index creation system 500, 900 may generate an interwoven token based on the primary and secondary codes and store them in the full text search index 504, 904 accordingly.

Likewise, if a user enters a search term into the navigation system 10, the FTS system 900 may generate primary and secondary codes using the known double metaphone algorithm. Then, the FTS system 900 may generate an interwoven token based on the generated primary and secondary codes and issue a query in accordance with the above-described systems and methods.

V. Conclusions

The FTS systems 500, 900 and the methods 700, 1000 may increase query processing speed. As a result, the FTS systems 500, 900 and the methods 700, 1000 may be beneficial during destination selection with a navigation system. However, based on this disclosure, those skilled in the art will realize that the FTS systems 500, 900 and the methods 700, 1000 may be used in navigation systems for other full text search applications.

Moreover, the FTS systems 500, 900 and the methods 700, 1000 may be used in other systems that perform full text searches, such as online search systems. Additionally, the FTS systems 500, 900 and the methods 700, 1000 may be used for full text search of musical pieces, which may be represented by the artist's name, the title, genre, and so on. If a user enters relatively unselective tokens, such as CLASSICAL, MADONNA, and LOVE, interwoven data tokens will be much more selective. As another example, book searching may also be facilitated using interwoven data tokens.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A computer-implemented method for facilitating full-text search, the method comprising:
   receiving a plurality of search terms;
   organizing the plurality of search terms into a lexicographically-ordered set of search terms, the lexicographically-ordered set of search terms including at least a first search term and a second search term;
   wherein the first search term is a first character string and the second search term is a second character string;
   generating an interwoven search token from the first search term and the second search term by interweaving characters of the first character string with characters of the second character string such that the interwoven character string contains alternating characters of the first character string and the second character string;
   querying a full text search index using the interwoven search token; and
   receiving, based on the querying, a result set that is associated with the plurality of search terms.

2. The method of claim 1, wherein generating an interwoven search token from the first search term and the second search term further comprises:
   generating the interwoven character string until all of the characters from one of the character strings have been used during the interweaving of the characters.

3. The method of claim 1, wherein generating an interwoven search token from the first search term and the second search term further comprises:
   generating the interwoven character string such that the interwoven character string has a number of characters equal to a predetermined number.

4. The method of claim 1, wherein generating an interwoven search token comprises generating a different interwoven search token for each unique pair of search terms in the plurality of search terms.

5. The method of claim 1,
   wherein the lexicographically-ordered set of search terms further includes a third search term, the third search term being a third character string, and
   wherein generating an interwoven search token from the first search term and the second search term comprises generating an interwoven character string by interweaving characters of the first character string with characters of the second character string with characters of the third character string such that (i) a first character of the interwoven character string and every third character thereafter is a character of the first search term, (ii) a second character of the interwoven character string and every third character thereafter is a character of the second search term, and (iii) a third character of the interwoven character string and every third character thereafter is a character of the third search term.

6. The method of claim 1, wherein receiving a plurality of search terms comprises:
   receiving at least one user-entered search term; and
   executing, based on the at least one user-entered search term, a double metaphone encoding algorithm, whereby the double metaphone encoding algorithm produces a plurality of search terms, the plurality of search terms including a primary search term and a secondary search term.

7. The method of claim 1, wherein the plurality of search terms are related to a destination search.

8. The method of claim 1, wherein the plurality of search terms are related to a music search.

9. The method of claim 1, wherein the plurality of search terms are related to a book search.

10. A computer-implemented method for creating interwoven tokens, the method comprising:
    organizing data tokens associated with a database entry into a lexicographically-ordered set of data tokens;
    based on a combination of at least two data tokens from the lexicographically-ordered set of data tokens, generating an interwoven data token through weaving characters of the at least two data tokens together such that the interwoven character string contains alternating characters of the at least two data tokens; and
    storing the interwoven data token in a full text search index such that the generated interwoven data token is associated with the database entry.

11. The method of claim 10, wherein based on a combination of at least two data tokens from the lexicographically-ordered set of data tokens, generating an interwoven data token comprises:
    for each unique combination of two data tokens in the lexicographically-ordered set of data tokens, wherein each unique combination of two data tokens comprises a first data token and a second data token, generating an interwoven character string by interweaving characters of the first data token with characters of the second data token such that the interwoven character string contains alternating characters of the first data token and the second data token.

12. The method of claim 11, wherein based on a combination of at least two data tokens from the lexicographically-ordered set of data tokens, generating an interwoven data token further comprises:
generating the interwoven character string such that the interwoven character string token has a number of characters equal to a predetermined number.

13. The method of claim 10, wherein based on a combination of at least two data tokens from the lexicographically-ordered set of data tokens, generating an interwoven data token comprises:
for each unique combination of three data tokens in the lexicographically-ordered set of data tokens, wherein each unique combination of three data tokens comprises a first data token, a second data token, and a third data token, generating an interwoven character string by interweaving characters of the first data token with characters of the second data token with characters of the third character data token such that (i) a first character of the interwoven character string and every third character thereafter is a character of the first data token, (ii) a second character of the interwoven character string and every third character thereafter is a character of the second data token, and (iii) a third character of the interwoven character string and every third character thereafter is a character of the third data token.

14. A navigation search system comprising:
a processor;
a geographic database that includes a full text search index; and
data storage containing instructions executable by the processor for carrying out destination selection functions, the functions including:
receiving a plurality of search terms;
organizing the plurality of search terms into a lexicographically-ordered set of search terms, the lexicographically-ordered set of search terms including at least a first search term and a second search term;
generating an interwoven search token from the first search term and the second search term by interweaving characters of the first search term with characters of the second search term such that the interwoven search token contains alternating characters of the first search term and the second search term;
querying the full text search index using the interwoven search token; and
receiving a result set of document identifiers associated with destinations.

15. The navigation system of claim 14, wherein the document identifiers associated with destinations are point of interest identifiers associated with point of interest records stored in the geographic database.

16. The navigation system of claim 14, wherein generating an interwoven search token from the first search term and the second search term further comprises:
generating the interwoven character string such that the interwoven character string has a number of characters equal to a predetermined number.

17. The navigation system of claim 14, wherein generating an interwoven search token comprises generating a different interwoven search token for each unique pair of search terms in the plurality of search terms.

18. The navigation system of claim 14, wherein the data storage further contains instructions executable by the processor for carrying out map display functions, the functions including:
receiving the result set of document identifiers;
retrieving the documents associated with the document identifiers from the geographic database; and
displaying a map that identifies locations specified within the documents.

19. The navigation system of claim 14, wherein receiving a plurality of search terms comprises:
receiving at least one user-entered search term; and
executing, based on the at least one user-entered search term, a double metaphone encoding algorithm, whereby the double metaphone encoding algorithm produces a plurality of search terms, the plurality of search terms including a primary search term and a secondary search term.

* * * * *